Patented Sept. 8, 1942

2,295,513

UNITED STATES PATENT OFFICE 2,295,513

UNSATURATED ESTER

Theodore F. Bradley, Stamford, Conn., assignor to American Cyanamid Company, New York, N. Y., a corporation of Maine No Drawing. Application February 28, 1941, Serial No. 381,129

1 Claim. (Cl. 260—485)

This invention relates to diesters of fumaric acid and alcohols containing at least one ethylenic linkage.

An object of the present invention is to provide new and useful esters of fumaric acid.

Esters which are the subject of the present invention have the following general formula

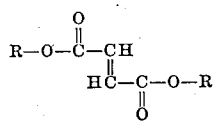

or more simply

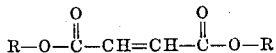

wherein R is an aliphatic radical containing at least one ethylenic linkage.

The following examples in which the proportions are in parts by weight are given by way of illustration and not in limitation.

Example 1

| | Parts |
|---|---|
| Fumaryl chloride | 40 |
| Allyl alcohol | 60 |

The fumaryl chloride is added slowly to the allyl alcohol and the resulting mixture is allowed to react at room temperature under anhydrous conditions. After the reaction has proceeded to a sufficient degree the excess allyl alcohol and the hydrogen chloride are removed upon gentle heating under vacuum. The resulting ester remaining is amber-colored and in order to obtain a substantially colorless product it is fractionated under reduced pressure and there is obtained a 73% yield of water-white diallyl fumarate boiling at 114–115° C. at 7 mm. of pressure. The acid number is 2.1, saponification number 575, refractive index, 1.4675 at 20° C. and the density, $$1.063 \text{ at } \frac{23°\text{ C.}}{15}$$

This liquid ester undergoes spontaneous polymerization at room temperatures during a period of several months, forming a rubber-like, water-white, solid gel comprising a mixture of unpolymerized and polymerized forms of the ester. The ultimate polymer is a hard, water-white, amorphous substance which is infusible and is also insoluble in the various common organic solvents. The polymer is highly water- and alkali-resistant and cannot be saponified by the usual methods to yield the alkali salt of fumaric acid.

Example 2

| | Parts |
|---|---|
| Fumaric acid | 116 |
| Allyl alcohol | 232 |
| Benzene | 54 |
| p-Toluene sulfonic acid | 3 |

This mixture is refluxed in a suitable apparatus provided with an agitator and a reflux condenser provided with a water trap in the condensate return line so that the mixture could be azeotropically distilled and the water separated off from the condensate. The mixture is refluxed under azeotropic conditions for about 18 hours. The product is distilled and the fraction boiling at about 147° C. at approximately 25 mm. of mercury is separated. This fraction is carefully redistilled at varying pressures and the boiling point at approximately 0.1 inch of mercury absolute pressure is about 102° C. It is very difficult to determine the boiling point of diallyl fumarate at reduced pressure accurately. While it is believed that the value given herein is substantially correct, it appears that values ranging from approximately 92° to about 110° C. may be obtained at about 0.1 inch of mercury absolute pressure, according to the purity of the material, the rate of distillation, etc. The diallyl fumarate which is thus redistilled has a specific gravity of about 1.052 at 34° C.

Diesters of fumaric acid such as the allyl esters may be produced by any suitable method other than those set forth in Examples 1 and 2. If the procedures of either Examples 1 or 2 be employed it is generally preferable that an excess of the molecular requirements of allyl alcohol be used in order to effect more complete reaction. If the procedure of Example 2 be followed, it is desirable that a small proportion of an esterification catalyst, e. g., mineral acids such as sulfuric acid, aromatic sulfonic acids such as benzyl sulfonic acid, p-toluene sulfonic acid, etc., be used. Generally 1–5% of catalyst based upon the weight of the fumaric acid is sufficient.

Following the procedure of Example 2, various organic solvents (usually inert) which are preferably substantially insoluble in water but which dissolve the reactants as well as the resulting ester are mixed with the reactants in order that the reflux operation may be carried out azeotropically and the water of condensation separated from the reacting mixture. The concentration of the inert organic solvent is preferably from about 15% to about 50% of the total weight of the reactants and organic solvent.

Diesters of fumaric acid and other unsaturated aliphatic alcohols may be produced in the same general manner as described in the preceding examples or in any other suitable manner as by the reaction of a fumaric acid salt with an alkylene monohalide. Thus dimethallyl fumarate, the diester of fumaric acid and methyl vinyl carbinol, dicrotyl fumarate, the diester of allyl carbinol and fumaric acid, the diester of beta-allyl ethyl alcohol and fumaric acid, the diesters of the halogenated unsaturated alcohols such as the diester of 2-chlorallyl alcohol and fumaric acid, the diester of allyl isopropyl carbinol and fumaric acid, the diester of citronellol and fumaric acid, the diester of geraniol and fumaric acid, the diester of oleyl alcohol and fumaric acid, etc., may be prepared.

Allyl esters produced according to my invention may be utilized for the production of resinous materials by polymerizing them alone or copolymerizing them with other unsaturated materials. They are especially suitable for copolymerization with vinyl acetate and with unsaturated fatty materials such as tung oil. Esters produced according to my invention are also suitable for use as plasticizers, solvents and as contact insecticides.

This application is a continuation-in-part of my copending application Serial No. 134,387, filed April 1, 1937, and entitled "Copolymers of convertible esters."

Obviously many modifications and variations in the processes and compositions described above may be made without departing from the spirit and scope of the invention as defined in the appended claim.

I claim:

Diallyl fumarate, a colorless, mobile liquid having a boiling point approximately 114–115° C. at 7 mm. of pressure.

THEODORE F. BRADLEY.